(12) United States Patent
Kaneko et al.

(10) Patent No.: US 11,658,557 B2
(45) Date of Patent: May 23, 2023

(54) CONTROL DEVICE AND CONTROL METHOD

(71) Applicant: TOYOTA JIDOSHA KABUSHIKI KAISHA, Toyota (JP)

(72) Inventors: Tomohiko Kaneko, Ashigarakami-gun (JP); Masayuki Ito, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 17/445,720

(22) Filed: Aug. 23, 2021

(65) Prior Publication Data

US 2022/0069693 A1  Mar. 3, 2022

(30) Foreign Application Priority Data

Aug. 25, 2020 (JP) .............................. JP2020-141751

(51) Int. Cl.
*H02M 1/00* (2006.01)

(52) U.S. Cl.
CPC .................................. *H02M 1/0003* (2021.05)

(58) Field of Classification Search
CPC ............. H02M 1/0003; H02M 1/0006; H02M 1/0009; H02M 1/0012
See application file for complete search history.

(56) References Cited

U.S. PATENT DOCUMENTS

| | | | |
|---|---|---|---|
| 9,660,512 B2 * | 5/2017 | Osanai ................. | H03K 17/795 |
| 10,749,442 B2 | 8/2020 | Kitamoto | |
| 2008/0238392 A1 | 10/2008 | Cheung et al. | |
| 2014/0111253 A1 * | 4/2014 | Fukuta .................... | H03K 3/01 |
| | | | 327/109 |
| 2019/0058411 A1 | 2/2019 | Kitamoto | |
| 2019/0149049 A1 | 5/2019 | Tashiro et al. | |

FOREIGN PATENT DOCUMENTS

| | | | | | |
|---|---|---|---|---|---|
| CN | 111413570 B | * | 7/2022 | ............. | G01R 19/00 |
| EP | 3961887 A1 | * | 3/2022 | ......... | H02M 1/0003 |
| JP | 2004282835 A | | 10/2004 | | |
| JP | 2018098855 A | | 6/2018 | | |
| JP | 6450884 B2 | | 12/2018 | | |

* cited by examiner

*Primary Examiner* — Adolf D Berhane
(74) *Attorney, Agent, or Firm* — Hunton Andrews Kurth LLP (57) ABSTRACT

A control device for a converter including a one-phase or multiple-phase converter circuit includes: a magnetic coupling determination unit configured to determine whether the converter circuit is a magnetically coupled circuit in which a reactor of the converter circuit is in a magnetically coupled state; and a control unit configured to change a control method for the converter according to a determination result of the magnetic coupling determination unit.

20 Claims, 3 Drawing Sheets

CONTROL DEVICE AND CONTROL METHOD

CROSS-REFERENCE TO RELATED APPLICATION

This application claims priority to Japanese Patent Application No. 2020-141751 filed on Aug. 25, 2020, incorporated herein by reference in its entirety.

BACKGROUND

1. Technical Field

The present disclosure relates to control devices and control methods for a converter.

2. Description of Related Art

Various studies have been conducted on converters that are provided in systems mounted on vehicles such as fuel cell electric vehicles. A control unit of the converter detects a current flowing through a reactor, and performs feedback control for adjusting the duty cycle of a switching element, based on the detection result. The control unit thus operates so that the converter outputs a larger current. In order to achieve responsive power conversion in response to a request from a load, it is common to use different control circuits for this operation according to the characteristics of the reactor. For example, Japanese Unexamined Patent Application Publication No. 2004-282835 (JP 2004-282835 A) discloses a technique in which a control unit of a power conversion unit switches between a boost circuit and a buck circuit in response to a request from a load.

Japanese Unexamined Patent Application Publication No. 2018-098855 (JP 2018-098855 A) discloses a technique in which a control unit of a converter changes feedback gain so that gain characteristics for instantaneous current values of a reactor have such a relationship that gain for small current values is relatively high and gain for large current values is relatively low.

SUMMARY

Miniaturization of power converter devices (converters) for vehicles such as automobiles is demanded due to limited mounting space, and one item that can achieve such miniaturization is a magnetically coupled inductor. The magnetically coupled inductor is a coupled inductor in which windings of multiple phases (coils) of the inductor are wound around a single magnetic core. In the magnetically coupled reactor, however, since the windings are wound around the single magnetic core, it is necessary to consider the magnitude of heat generation, leakage flux, etc. Accordingly, if these problems cannot be solved, it is also possible to use a non-magnetically coupled reactor with a single winding wound around a single magnetic core. A suitable converter varies depending on whether the converter is used for automobiles. Even when the converter is used for automobiles, a suitable converter varies depending on the type of automobile, the mounting position of the converter, etc. One way to provide a suitable converter is to use different types of reactor such as a magnetically coupled type, a non-magnetically coupled type, or a combination thereof according to the suitable converter. A control device that is incorporated into a converter including a magnetically coupled reactor and a control device that is incorporated into a converter including a non-magnetically coupled reactor need to have different control conditions from each other. In the related art, it is necessary to prepare different control circuits according to the type of reactor etc. In the future, it is expected that converters will be sold on the market, repaired, or even customized as desired by the user, just like other automobile parts. In such a case, it is not always desirable that a reactor, a control circuit, etc. that form a converter be distributed as a set with the automobile parts. It is desired to control converters by the same control circuit while making it possible to use different reactors according to the required output, mounting space, etc. However, the techniques disclosed in JP 2004-282835 A and JP 2018-098855 A are not techniques in which reactors of different types are used and a converter is controlled by the same control circuit regardless of the type of reactor.

The present disclosure provides a control device that can control a converter by the same control circuit regardless of the type of reactor.

One aspect of the present disclosure provides a control device for a converter. The converter includes a one-phase or multiple-phase converter circuit. The control device includes: a magnetic coupling determination unit configured to determine whether the converter circuit is a magnetically coupled circuit in which a reactor of the converter circuit is in a magnetically coupled state; and a control unit configured to change a control method for the converter according to a determination result of the magnetic coupling determination unit.

In the control device of the above aspect, the control unit may be configured to change at least one control method for the converter according to the determination result of the magnetic coupling determination unit, the control method being selected from a group including feedforward control, feedback control, and shutdown control.

In the control device of the above aspect, the control unit may be configured to, when the magnetic coupling determination unit determines that the converter circuit is the magnetically coupled circuit, perform the feedback control in which the control unit changes a feedback gain such that the feedback gain becomes (L2−M)/L1 times as large as the feedback gain when the magnetic coupling determination unit determines that the converter circuit is a non-magnetically coupled circuit in which the reactor of the converter circuit is in a non-magnetically coupled state, where L1 represents self-inductance of a non-magnetically coupled reactor, L2 represents self-inductance of a magnetically coupled reactor, and M represents mutual inductance of the magnetically coupled reactor.

The control device of the above aspect may further include a failure determination unit configured to determine whether each of multiple phases of the converter circuit has failed, and the control unit may be configured to, when the magnetic coupling determination unit determines that the converter circuit is the magnetically coupled circuit and the failure determination unit determines that one or more phases included in the multiple phases of the converter circuit have failed, perform the shutdown control in which the control unit stops operation of the failed one or more phases of the converter circuit and stops operation of one or more phases that are included in the remainder of the multiple phases of the converter circuit and that are magnetically coupled to the failed one or more phases of the converter circuit.

In the control device of the above aspect, each of multiple phases of the converter circuit may be provided with a switch unit, and the magnetic coupling determination unit may be configured to determine that each of the multiple phases of the converter circuit is the magnetically coupled circuit when a slope of a waveform of a current flowing through one of the multiple phases of the converter circuit with respect to time changes at a timing of operation of switching on or off the switch unit of another phase included in the remainder of the multiple phases of the converter circuit, while the control unit switches on or off the switch units of the multiple phases of the converter circuit at different timings.

In the control device of the above aspect, each of multiple phases of the converter circuit may be provided with a switch unit, and the magnetic coupling determination unit may be configured to determine that each of the multiple phases of the converter circuit is the magnetically coupled circuit when a slope of a waveform of a current flowing through one of the multiple phases of the converter circuit with respect to time changes at a timing that is other than a timing when the switch unit of the one of the multiple phases of the converter circuit is switched on or off and a timing when a value of the current becomes zero, while the control unit switches on or off the switch units of the multiple phases of the converter circuit at different timings.

In the control device of the above aspect, the magnetic coupling determination unit may be configured to determine that the converter circuit is the magnetically coupled circuit when a change in an inlet current of the converter that occurs at a timing when the control unit changes a duty cycle of the converter circuit from 0.25 to 0.50 while an outlet voltage of the converter is twice or more an inlet voltage of the converter is 3 A or less.

The control device of the above aspect may further include an operating state acquisition unit configured to acquire an operating state of the converter circuit during operation of the converter, and the magnetic coupling determination unit may be configured to determine whether the converter circuit is the magnetically coupled circuit according to the operating state acquired by the operating state acquisition unit.

In the control device of the above aspect, the operating state acquisition unit may be configured to acquire the number of driving phases of the converter circuit, and the magnetic coupling determination unit may be configured to determine whether the converter circuit is the magnetically coupled circuit when the number of the driving phases of the converter circuit changes.

In the control device of the above aspect, the operating state acquisition unit may be configured to acquire at least one operating state value selected from a group including an inlet current value of the converter and an inlet voltage value of the converter, and the magnetic coupling determination unit may be configured to determine whether the converter circuit is the magnetically coupled circuit when the operating state value is equal to or larger than a predetermined value.

Another aspect of the present disclosure provides a control method for a converter including a one-phase or multiple-phase converter circuit. This control method includes: determining by a magnetic coupling determination unit of a control device whether the converter circuit is a magnetically coupled circuit in which a reactor of the converter circuit is in a magnetically coupled state; and changing by a control unit of the control device a control method for the converter according to a determination result of the magnetic coupling determination unit.

In the control method of the above aspect, at least one control method for the converter, the control method being selected from a group including feedforward control, feedback control, and shutdown control, may be changed by the control unit according to the determination result of the magnetic coupling determination unit.

In the control method of the above aspect, when the magnetic coupling determination unit determines that the converter circuit is the magnetically coupled circuit, the feedback control may be performed in which the control unit changes a feedback gain such that the feedback gain becomes $(L2-M)/L1$ times as large as the feedback gain when the magnetic coupling determination unit determines that the converter circuit is a non-magnetically coupled circuit in which the reactor of the converter circuit is in a non-magnetically coupled state, where L1 represents self-inductance of a non-magnetically coupled reactor, L2 represents self-inductance of a magnetically coupled reactor, and M represents mutual inductance of the magnetically coupled reactor.

The control method of the above aspect may further include determining by a failure determination unit of the control device whether each of multiple phases of the converter circuit has failed. When the magnetic coupling determination unit determines that the converter circuit is the magnetically coupled circuit and the failure determination unit determines that one or more phases included in the multiple phases of the converter circuit have failed, the shutdown control may be performed in which the control unit stops operation of the failed one or more phases of the converter circuit and stops operation of one or more phases that are included in the remainder of the multiple phases of the converter circuit and that are magnetically coupled to the failed one or more phases of the converter circuit.

In the control method of the above aspect, each of multiple phases of the converter circuit may be provided with a switch unit, and the magnetic coupling determination unit may determine that each of the multiple phases of the converter circuit is the magnetically coupled circuit when a slope of a waveform of a current flowing through one of the multiple phases of the converter circuit with respect to time changes at a timing of operation of switching on or off the switch unit of another phase included in the remainder of the multiple phases of the converter circuit, while the control unit switches on or off the switch units of the multiple phases of the converter circuit at different timings.

In the control method of the above aspect, each of multiple phases of the converter circuit may be provided with a switch unit, and the magnetic coupling determination unit may determine that each of the multiple phases of the converter circuit is the magnetically coupled circuit when a slope of a waveform of a current flowing through one of the multiple phases of the converter circuit with respect to time changes at a timing that is other than a timing when the switch unit of the one of the multiple phases of the converter circuit is switched on or off and a timing when a value of the current becomes zero, while the control unit switches on or off the switch units of the multiple phases of the converter circuit at different timings.

In the control method of the above aspect, the magnetic coupling determination unit may determine that the converter circuit is the magnetically coupled circuit when a change in an inlet current of the converter that occurs at a timing when the control unit changes a duty cycle of the converter circuit from 0.25 to 0.50 while an outlet voltage of the converter is twice or more an inlet voltage of the converter is 3 A or less.

The control method of the above aspect may further include acquiring by an operating state acquisition unit of the control device an operating state of the converter circuit during operation of the converter. The magnetic coupling determination unit may determine whether the converter circuit is the magnetically coupled circuit according to the acquired operating state.

In the control method of the above aspect, the number of driving phases of the converter circuit may be acquired by the operating state acquisition unit, and the magnetic coupling determination unit may determine whether the converter circuit is the magnetically coupled circuit when the number of the driving phases of the converter circuit changes.

In the control method of the above aspect, at least one operating state value selected from a group including an inlet current value of the converter and an inlet voltage value of the converter may be acquired by the operating state acquisition unit, and the magnetic coupling determination unit may determine whether the converter circuit is the magnetically coupled circuit when the operating state value is equal to or larger than a predetermined value.

According to the control device and the control method of the present disclosure, the converter can be controlled by the same control circuit regardless of the type of reactor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One aspect of the present disclosure provides a control device for a converter. The converter includes a one-phase or multiple-phase converter circuit. The control device includes: a magnetic coupling determination unit configured to determine whether the converter circuit is a magnetically coupled circuit in which a reactor of the converter circuit is in a magnetically coupled state; and a control unit configured to change a control method for the converter according to the determination result of the magnetic coupling determination unit.

When a magnetically coupled converter circuit is driven by control software for non-magnetically coupled converter circuits or a non-magnetically coupled converter circuit is driven by control software for magnetically coupled converter circuits, a current flowing through a reactor may oscillate strongly and an overcurrent may occur in the reactor. This is because the non-magnetically coupled converter circuit and the magnetically coupled converter circuit have different dynamic characteristics.

Figure 1:
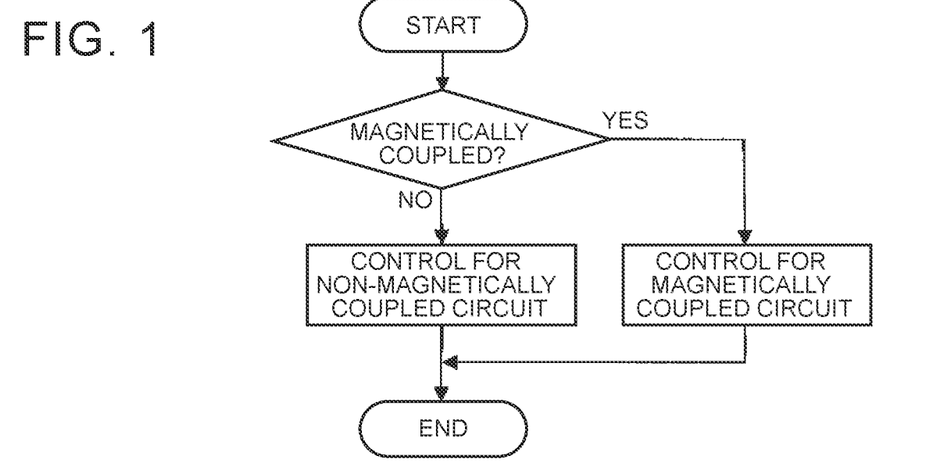
FIG. 1 is a flowchart of an example of control that is performed by a control device of the present disclosure.

FIG. 1 is a flowchart of an example of control that is performed by the control device of the present disclosure. As shown in FIG. 1, in the present disclosure, it is determined whether the converter circuit is a magnetically coupled circuit in which the reactor of the converter circuit is in a magnetically coupled state, and the control method is changed according to the determination result. Accordingly, regardless of whether the converter circuit is a non-magnetically coupled circuit or a magnetically coupled circuit, oscillation of the reactor current can be reduced by the same control software, and the possibility of an overcurrent can be reduced. According to the present disclosure, regardless of whether the converter is a converter including a magnetically coupled reactor, a converter including a non-magnetically coupled reactor, or a converter including both a magnetically coupled reactor and a non-magnetically coupled reactor, and regardless of whether it is when the operation of a vehicle is started or when the vehicle is in operation, it can be properly and accurately determined whether there is magnetic coupling of coils of the reactor. The converter can thus be controlled by the same control circuit regardless of the type of reactor.

The control device of the present disclosure is a control device for a converter and includes at least a magnetic coupling determination unit and a control unit, and as necessary, further includes a failure determination unit, an operating state acquisition unit, etc.

The converter may be a boost converter, a buck converter, or a buck-boost converter. The converter includes a one-phase or multiple-phase converter circuit. When the converter has multiple-phase converter circuits, the multiple phases of the converter circuit may be connected in parallel, and the multiple phases of the converter circuit may or may not be magnetically coupled to each other. For example, in the case where the converter has a two-phase converter circuit, the two phases of the converter circuit are connected in parallel, and the two phases of the converter circuit are a conversion pair that can be magnetically coupled to each other, the converter behaves as a non-magnetically coupled circuit when only one of the two phases is driven. The converter circuit is a circuit for voltage conversion, and includes a reactor, a switch unit configured to allow or stop a current flow to one coil wound around a core included in the reactor, a diode, etc., and as necessary, further includes a current sensor configured to detect a current flowing through the reactor or the coil, etc. In the case where coils of the multiple phases of the converter circuit share a core of a single reactor, the multiple phases of the converter circuit can be magnetically coupled to each other. The reactor may have one core and one or more coils wound around the core. Each coil of the reactor may be part of the configuration of each phase of the converter circuit. The coils of the phases of the converter circuit that are magnetically coupled to each other may share a core of a single reactor. The core and the coils are not particularly limited, and cores and coils that are used in conventionally known reactors may be used. The switch unit may be a switching element. The switching element may be an insulated gate bipolar transistor (IGBT), a metal-oxide-semiconductor field-effect transistor (MOSFET), etc.

The control unit changes the control method for the converter according to the determination result of the magnetic coupling determination unit. The control unit physically includes, e.g., an arithmetic processing unit such as a central processing unit (CPU), a storage device such as a read-only memory (ROM) that stores control programs, control data, etc. to be processed by the CPU and a random access memory (RAM) to be mainly used as various work areas for control processes, and an input-output interface. The control unit may be, e.g., a control device such as an engine control unit (ECU). The control unit may be connected to the converter, the switch unit, the magnetic coupling determination unit, the failure determination unit, the operating state acquisition unit, etc. via the input-output interface. The control unit may be electrically connected to an ignition switch that may be mounted on the vehicle. The control unit is electrically connected to the converter and controls the output voltage of the converter to obtain a voltage required by the vehicle etc. The control unit controls the number of driving phases of the converter circuit and controls the output voltage of the converter by, e.g., switching on or off the switch unit of the converter circuit.

Examples of the types of converter control that is performed by the control unit include feedforward control, feedback control, and shutdown control. The control unit may change at least one control method for the converter. The control method is selected from the group including feedforward control, feedback control, and shutdown control, according to the determination result of the magnetic coupling determination unit.

In the feedforward control, for example, predetermined calculation formulas for feedforward duty cycles corresponding to normal buck-boost operation (non-magnetic coupling buck-boost operation) and magnetic coupling buck-boost operation may be derived in advance and converted in advance to a data group of feedforward duty cycles corresponding to the reactor current command values for each phase of the converter circuit, and each phase of the converter circuit may be controlled independently by using the data group. For example, when the converter circuit is a magnetically coupled circuit, a predetermined calculation formula for a feedforward duty cycle to be used in a discontinuous mode may be derived in advance and converted in advance to a data group of feedforward duty cycles corresponding to reactor current command values, and control such as determining the feedforward duty cycle may be performed by checking a reactor current command value against the data group.

In the feedback control, for example, when the magnetic coupling determination unit determines that the converter circuit is a magnetically coupled circuit, the control unit may change the feedback gain to (L2−M)/L1 times as large as when the magnetic coupling determination unit determines that the converter circuit is a non-magnetically coupled circuit. L1 represents the self-inductance of the non-magnetically coupled reactor, L2 represents the self-inductance of the magnetically coupled reactor, and M represents the mutual inductance of the magnetically coupled reactor. The values of L1, L2, and M may be defined in advance as constants in software etc. provided in the control unit. Specific calculation formulas for setting the feedback gain to a value that is (L2−M)/L1 as large are shown below.

Figure 2:
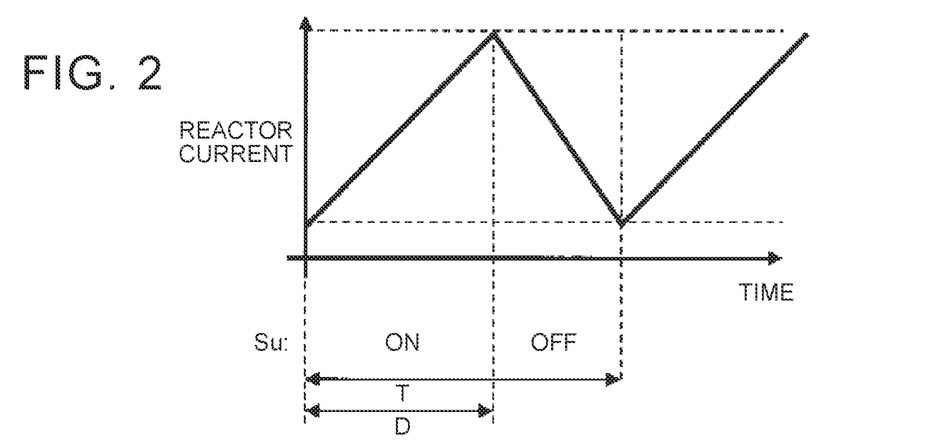
FIG. 2 shows an example of a current waveform of a non-magnetically coupled booster circuit.

FIG. 2 shows an example of a current waveform of a non-magnetically coupled booster circuit. Changes in voltage and current applied to the coil with the inductance L with time during an ON period and an OFF period are given by the following differential equations (a) and (b), respectively. In the differential equations (a) and (b), L represents inductance, I represents a current flowing through the coil, $V_L$ represents an input voltage (voltage before conversion), $V_H$ represents an output voltage (voltage after conversion), T represents time, and D represents a duty cycle.

ON period: $dI/dt = V_L/L$ (a)

ON time: $TD$

OFF period: $dI/dt = (V_L - V_H)/L$ (b)

OFF time: $T - TD$

The following differential equation (c) is obtained from the differential equations for the ON period and the OFF period by state-space averaging.

$dI/dt = (V_L/L)D + \{(V_L - V_H)/L\}(1-D)$ (c)

Simplifying the differential equation (c) results in the following equation (1) for the non-magnetically coupled circuit.

$dI/dt = (V_L - V_H)/L + (V_H/L)D$ (1)

The equation (1) is divided into a steady part and an oscillatory part based on $I = I_\infty + i$ and $D = D_\infty + d$. The steady part is given by $D_\infty = (V_H - V_L)/V_H = 1 - V_L/V_H$. Since $dI_\infty/dt = 0$ by definition. Therefore, the oscillatory part is given by the following equation (1-1).

$di/dt = (V_H/L)d$ (1-1)

This is the dynamic characteristics of the non-magnetically coupled circuit.

Figure 3:
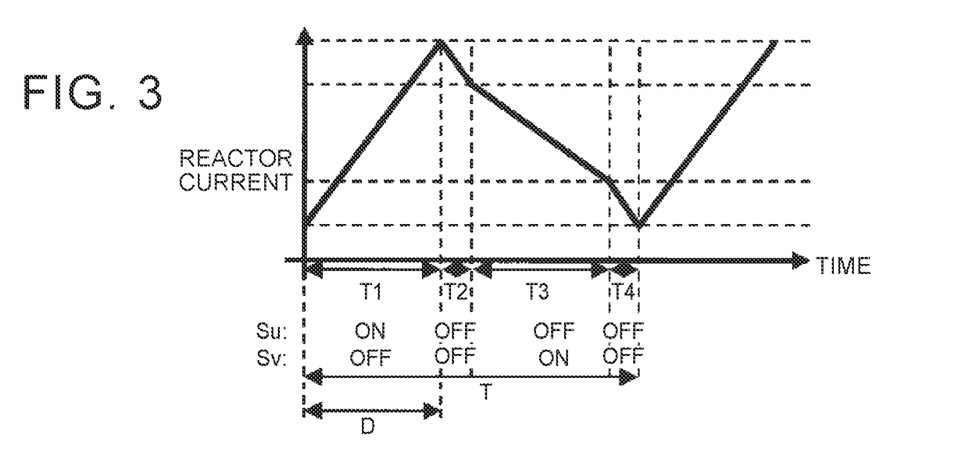
FIG. 3 shows an example of a current waveform of a magnetically coupled booster circuit for D≤0.5.

FIG. 3 shows an example of a current waveform of a magnetically coupled booster circuit for D≤0.5. Changes in voltage and current applied to the coil with the inductance L with time during periods $T_1$ to $T_4$ shown in FIG. 3 are given by the following differential equations (d) to (g), respectively. In the differential equations (d) to (g), L represents inductance, M represents the mutual inductance of the magnetically coupled reactor, I represents a current flowing through the coil, $V_L$ represents an input voltage (voltage before conversion), $V_H$ represents an output voltage (voltage after conversion), T represents time, and D represents a duty cycle.

Period $T1$: $dI/dt = \{1/(L^2 - M^2)\}\{LV_L + M(V_L - V_H)\}$ (d)

Period $T2$: $dI/dt = \{1/(L^2 - M^2)\}(L+M)(V_L - V_H)$ (e)

Period $T3$: $dI/dt = \{1/(L^2 - M^2)\}\{L(V_L - V_H) + MV_L\}$ (f)

Period $T4$: $dI/dt = \{1/(L^2 - M^2)\}(L+M)(V_L - V_H)$ (g)

$T_1 = T_3 = TD$ $T_2 = T_4 = T/2 - TD$

The following differential equation (h) is obtained from the differential equations for the periods T1 to T4 by state-space averaging.

$dI/dt = \{1/(L^2 - M^2)\}\{LV_L + M(V_L - V_H)\} \times D +$
$\{1/(L^2 - M^2)\}(L+M)(V_L - V_H) \times (\frac{1}{2} - D) +$
$\{1/(L^2 - M^2)\}\{L(V_L - V_H) + MV_L\} \times D + \{1/(L^2 - M^2)\}$
$(L+M)(V_L - V_H) \times (\frac{1}{2} - D)$ (h)

Simplifying the differential equation (h) results in the following equation (2) for the magnetically coupled circuit for D≤0.5.

$dI/dt = (V_L - V_H)/(L-M) + V_H/(L-M) \times D$ (2)

Figure 4:
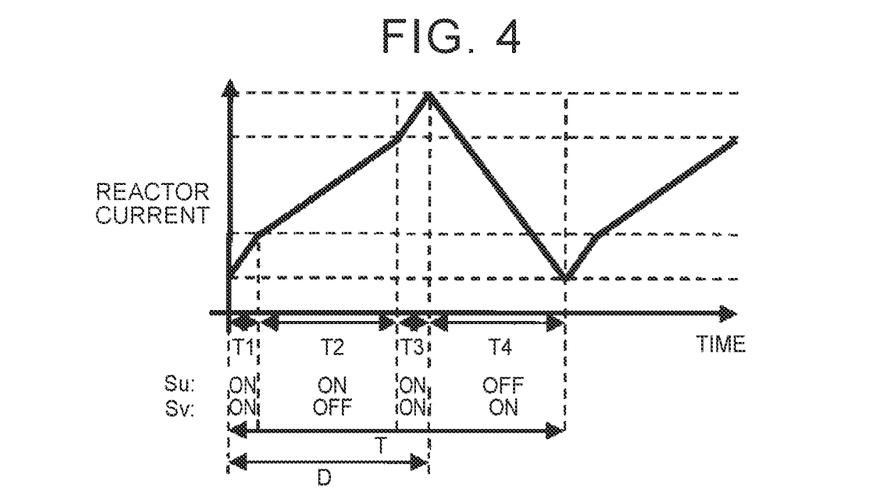
FIG. 4 shows an example of a current waveform of the magnetically coupled booster circuit for D>0.5.

FIG. 4 shows an example of a current waveform of the magnetically coupled booster circuit for D>0.5. Changes in voltage and current applied to the coil with the inductance L with time during periods T1 to T4 shown in FIG. 4 are given by the following differential equations (i) to (l), respectively. The meaning of the symbols used in the following differential equations is the same as that of the symbols used in the above differential equations (d) to (g).

Period T1: $dI/dt=\{1/(L^2-M^2)\}(LV_L+MV_L)$ (i)

Period T2: $dI/dt=\{1/(L^2-M^2)\}\{LV_L+M(V_L-V_H)\}$ (j)

Period T3: $dI/dt=\{1/(L^2-M^2)\}(LV_L+MV_L)$ (k)

Period T4: $dI/dt=\{1/(L^2-M^2)\}\{L(V_L-V_H)+MV_L\}$ (l)

$T_1=T_3=TD-T/2$ $T_2=T_4=T-TD$

The following differential equation (m) is obtained from the differential equations for the periods T1 to T4 by state-space averaging.

$dI/dt=\{1/(L^2-M^2)\}(LV_L+MV_L)\times(D-\frac{1}{2})+$
$\{1/(L^2-M^2)\}\{LV_L+M(V_L-V_H)\}\times(1-D)+\{1/(L^2-M^2)\}(LV_L+MV_L)\times(D-\frac{1}{2})+\{1/(L^2-M^2)\}\{L(V_L-V_H)+MV_L\}\times(1-D)$ (m)

Simplifying the differential equation (m) results in the following equation (3) for the magnetically coupled circuit for D>0.5.

$dI/dt=(V_L-V_H)/(L-M)+V_H/(L-M)\times D$ (3)

The equations (2) and (3) are the same. This shows that, for the magnetically coupled circuit, the current waveform with time varies depending on the duty cycle, but the equation for the magnetically coupled circuit is the same regardless of the numerical value of the duty cycle. The equations (2) and (3) are divided into a steady part and an oscillatory part based on $I=I_\infty+i$ and $D=D_\infty+d$. The steady part is given by $D_\infty=(V_H-V_L)/V_H=1-V_L/V_H$, since $dI_\infty/dt=0$ by definition. The oscillatory part is given by the following equation (2-2).

$di/dt=\{V_H/(L-M)\}d$ (2-2)

This is the dynamic characteristics of the magnetically coupled circuit. Comparison between the dynamic characteristics of the non-magnetically coupled circuit given by the equation (1-1) and the dynamic characteristics of the magnetically coupled circuit given by the equation (2-2) shows that the dynamic characteristics of the magnetically coupled circuit are exactly (L−M)/L times the dynamic characteristics of the non-magnetically coupled circuit.

For example, the control device of the present disclosure may include a failure determination unit configured to determine whether each of the multiple phases of the converter circuit has failed. In the shutdown control, when the magnetic coupling determination unit determines that the converter circuit is a magnetically coupled circuit and the failure determination unit determines that one or more of the multiple phases of the converter circuit have failed, the operation of the failed phase(s) of the converter circuit may be stopped, and one or more of the other phases of the converter circuit magnetically coupled to the failed phase(s) of the converter circuit may be stopped. That is, in the shutdown control, when the converter circuit is a magnetically coupled circuit and a specific driving phase (converter circuit) has failed, change is made to prohibit subsequent driving of not only the failed phase but also each phase magnetically coupled to the failed phase. The failure determination unit is not particularly limited as long as it can determine whether each of the multiple phases of the converter circuit has failed. The control unit may have the function of the failure determination unit. The timing at which the failure determination unit determines a failure is not particularly limited, and may be the timing at which the magnetic coupling determination unit determines that the converter circuit is a magnetically coupled circuit.

The magnetic coupling determination unit is not particularly limited as long as it can determine whether the converter circuit is a magnetically coupled circuit in which the reactor of the converter circuit is in a magnetically coupled state. The control unit may have the function of the magnetic coupling determination unit. The reactor being in a magnetically coupled state means the state in which the coils shares the core of the reactor and the coils are electrically connected to each other. The reactor being in a non-magnetically coupled state may be the state in which, even when the coils share the core of the reactor, only one phase of the converter circuit out of a conversion set, namely a set of the phases of the converter circuit having the coils sharing the core, is being driven. The reactor being in a non-magnetically coupled state may be the state in which only one coil is wound around the core of the reactor and the converter circuit having the reactor is being driven. In the present disclosure, the reactor in a magnetically coupled state is sometimes referred to as the magnetically coupled reactor, and the reactor in a non-magnetically coupled state is sometimes referred to as the non-magnetically coupled reactor. The converter circuit including the magnetically coupled reactor is sometimes referred to as the magnetically coupled circuit, and the converter circuit including the non-magnetically coupled reactor is sometimes referred to as the non-magnetically coupled circuit.

The magnetic coupling determination unit may determine that each of the multiple phases of the converter circuit is a magnetically coupled circuit when the control unit switches on or off the switch units of the multiple phases of the converter circuit at different timings and the slope of the waveform of the current flowing through one of the phases of the converter circuit with time changes at the timing of the operation of switching on or off switch units of the remainder of the phases of the converter circuit. The magnetic coupling determination unit may determine that each of the multiple phases of the converter circuit is a magnetically coupled circuit when the control unit switches on or off the switch units of the multiple phases of the converter circuit at different timings and the slope of the waveform of the current flowing through one of the phases of the converter circuit with time changes except when a switch unit of the one phase of the converter circuit is switched on or off and when the current value becomes zero.

In the case where the switching element is switched off in one of the phases of the converter circuit and at the same time the switching element is switched on in another one of the phases of the converter circuit, these switching timings are not considered to be different timings but considered to be the same timing. A current flowing through the converter circuit with time may be measured by a conventionally known current sensor etc. that may be provided in the control device, the converter circuit, etc. With the above determination method, when a current flowing through the reactor is sampled a plurality of times and there is an inflection point in the current flowing through the reactor except when the switching operation for a certain phase (converter circuit) is performed and when the current value of this certain phase reaches 0, it can be determined that the converter circuit is a magnetically coupled circuit. However, in order to check whether there is an inflection point, it is necessary to sample the current at least three times during the switch ON period of the certain phase. When the driving frequency of the converter circuit is high, the sampling acquisition intervals of a microcomputer that may be included in the control device may become short, and the processing may not be able to be performed in time.

Figure 5:
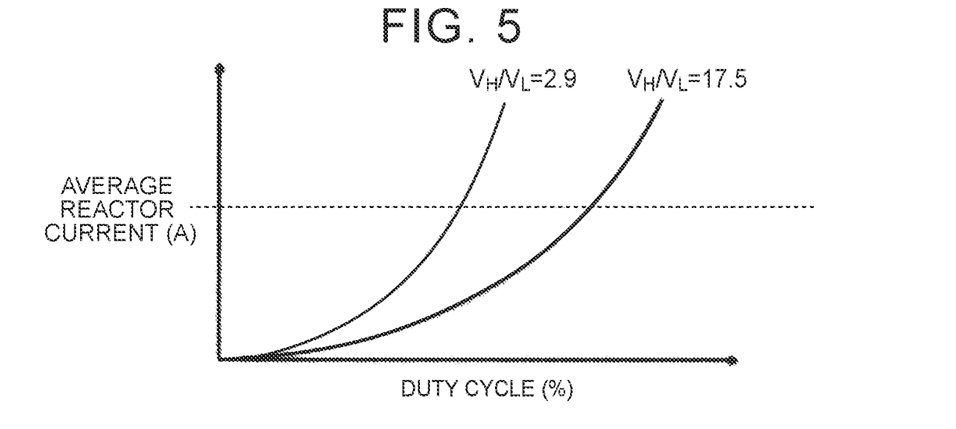
FIG. 5 shows an example of the relationship of the average reactor current to the duty cycle (%) in a non-magnetically coupled circuit.
Figure 6:
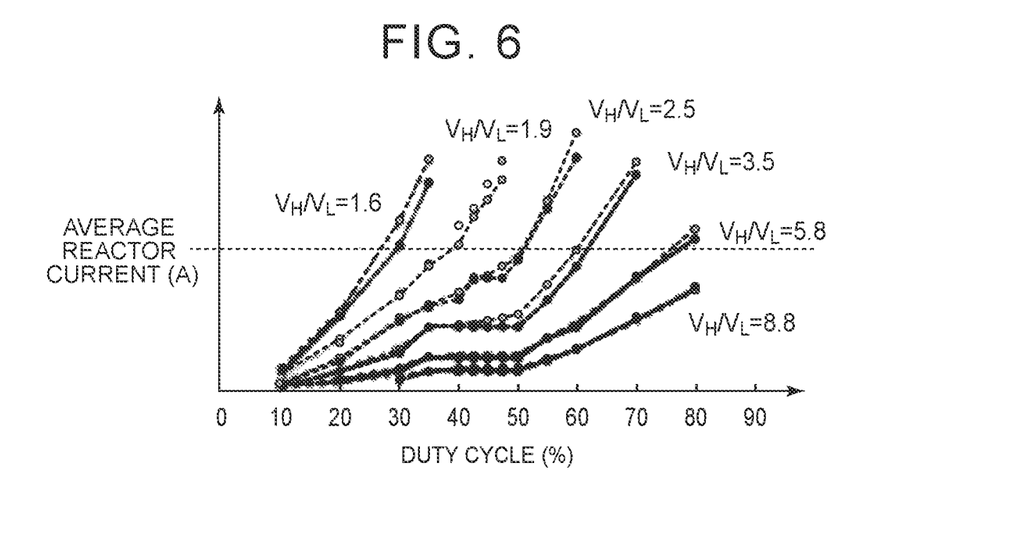
FIG. 6 shows an example of the relationship of the average reactor current to the duty cycle (%) in a magnetically coupled circuit.

FIG. 5 shows an example of the relationship of the average reactor current to the duty cycle (%) in the non-magnetically coupled circuit. FIG. 6 shows an example of the relationship of the average reactor current to the duty cycle (%) in the magnetically coupled circuit. As shown in FIG. 5, in the case of the non-magnetically coupled circuit, the current value is increased by increasing the duty cycle even at a high boost ratio, and a desired current value can be obtained. On the other hand, as shown in FIG. 6, in the case of the magnetically coupled circuit, as the boost ratio becomes higher, the current value is increased only slightly or hardly increased even by increasing the duty cycle, and it is therefore difficult to obtain a desired current value. Accordingly, when the outlet voltage of the converter circuit is set to several times the inlet voltage of the converter circuit and there is little change in inlet current of the converter (little change in average value of the current flowing through the reactor) when the control unit increases the duty ratio of the driving pulses of the switching element, the magnetic coupling determination unit may determine that the converter circuit is a magnetically coupled circuit. When there is a one-phase or multiple-phase converter circuit that shares the core of the reactor of the converter circuit determined to be a magnetically coupled circuit, the magnetic coupling determination unit may determine that this one-phase or multiple-phase converter circuit is also a magnetically coupled circuit.

The outlet voltage of the converter circuit need only be several times or more the inlet voltage of the converter circuit. The outlet voltage of the converter circuit may be twice or more, 3.5 times or more, or 10 times or less the inlet voltage of the converter circuit. The duty cycle before being increased may be 0.20 or more, 0.25 or more, or less than 0.50. The increased duty cycle may be larger than 0.20, larger than 0.25, 0.60 or less, or 0.50 or less. A change in inlet current of the converter (change in average value of the current flowing through the reactor) may be 7 A or less, 5 A or less, or 3 A or less. Specifically, for example, the magnetic coupling determination unit may determine that the converter circuit is a magnetically coupled circuit when the outlet voltage of the converter is twice or more the inlet voltage of the converter and a change in inlet current of the converter that occurs when the control unit changes the duty cycle of the converter circuit from 0.25 to 0.50 is 3 A or less. With this determination method, even when the driving frequency of the converter circuit is as high as 50 kHz or more, whether the converter circuit is a magnetically coupled circuit can be determined regardless of the sampling of the microcomputer. The circuit type of the converter circuit can thus be accurately determined.

The control device of the present disclosure may be mounted on a system such as a fuel cell system equipped with a converter. The system may determine whether the converter circuit of the converter is a magnetically coupled circuit. In this case, whether the converter circuit of the converter is a magnetically coupled circuit can be determined when the system is started. However, depending on the configuration of the system equipped with the converter, the converter may be switched between a magnetically coupled circuit and a non-magnetically coupled circuit according to the operating conditions of the vehicle equipped with the system. For example, immediately after the system is started, the required system power is small and therefore one-phase driving is performed. In this case, the converter circuit is a non-magnetically coupled circuit. However, as the required system power increases subsequently, two-phase driving may be performed, that is, the converter circuit may be switched to a magnetically coupled circuit. It is herein assumed that, when the system is started, the magnetic coupling determination unit determines whether the converter circuit is a magnetically coupled circuit, and the magnetic coupling determination unit determines that the converter circuit is a non-magnetically coupled circuit. In this case, if the converter circuit switches to a magnetically coupled circuit under the same feedback gain conditions as those for the non-magnetically coupled circuit, a current flowing in the reactor may oscillate strongly and an overcurrent may occur in the reactor.

Figure 7:
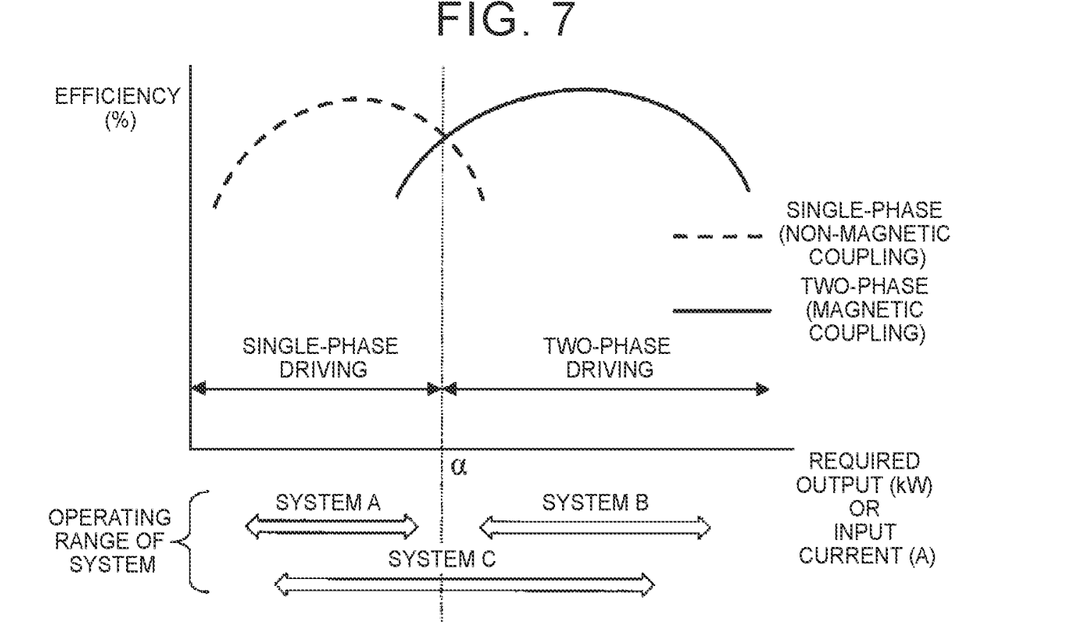
FIG. 7 shows the relationship between the required output and the efficiency, and the operating range in each system.

FIG. 7 shows the relationship between the required output and the efficiency, and the operating range in each system. In the boost converter, when the required output is less than a shown in FIG. 7, it is preferable to perform one-phase driving (normal boosting) as the one-phase driving (non-magnetic coupling) provides higher power conversion efficiency. When the required output is a or more shown in FIG. 7, it is preferable to perform two-phase driving (magnetic coupling) as the two-phase driving (magnetic coupling) provides higher power conversion efficiency. For example, for a system A, since the required output is always less than a, determination of "magnetic coupling or non-magnetic coupling" is made when, for example, the operation is started, and the subsequent control is performed under the conditions for non-magnetic coupling boosting. Control can thus always be performed under appropriate conditions. Similarly, for a system B, since the required output is always a or more, determination of "magnetic coupling or non-magnetic coupling" is made when, for example, the operation is started, and the subsequent control is performed under the conditions for magnetic coupling. Control can thus always be performed under appropriate conditions. The control device of the present disclosure can be operated under appropriate conditions by incorporating the control devices with the same specifications into the system A and the system B and making determination of "magnetic coupling or non-magnetic coupling" when the operation is started.

On the other hand, for a system C, the range of the requested output includes the threshold value a. Accordingly, even if determination of "magnetic coupling or non-magnetic coupling" is made when the operation is started, the determination result may change during the operation. For example, in a fuel cell electric vehicle that runs on a motor powered by a fuel cell, the output required for the fuel cell varies significantly depending on various conditions such as vehicle speed, acceleration, load weight, and slope of the road. There are cases where the output voltage of the fuel cell is boosted by a boost converter to a voltage that drives the motor, and is supplied to the motor. In the above configuration, the output power of the boost converter also varies significantly depending on the operating conditions. For example, immediately after the vehicle starts traveling, the vehicle is operated at low speeds in town. The required system power is therefore small and the converter is driven by one-phase driving (non-magnetic coupling). However, when the vehicle subsequently enters a highway and travels at high speeds, the required system power is large, and the converter may be driven by two-phase driving (magnetic coupling). If determination of magnetic coupling or non-magnetic coupling is made when the system is started, and transition to magnetic coupling boosting is made under the same conditions as those for non-magnetic coupling boosting, the reactor current may oscillate strongly and an overcurrent may occur in the reactor.

Accordingly, the control device of the present disclosure may further include an operating state acquisition unit that acquires the operating state of the converter circuit during operation of the converter, and the magnetic coupling determination unit may determine whether the converter circuit is a magnetically coupled circuit, according to the operating state acquired by the operating state acquisition unit. The converter can thus be controlled under appropriate conditions at all times during operation of the system, and the possibility that an overcurrent may occur in the reactor can be reduced. The operating state acquisition unit is not particularly limited as long as it can acquire the operating state of the converter circuit during operation of the converter, and the control unit may have the function of the operating state acquisition unit.

The operating state of the converter circuit may be, e.g., the number of driving phases of the converter circuit. In this case, the operating state acquisition unit may acquire the number of driving phases of the converter circuit during operation of the converter, and the magnetic coupling determination unit may determine whether the converter circuit is a magnetically coupled circuit, when the number of driving phases of the converter circuit changes. The timing at which the operating state acquisition unit acquires the number of driving phases of the converter circuit is not particularly limited as long as it is during operation of the converter. The operating state acquisition unit may acquire the number of driving phases of the converter circuit constantly, at predetermined time intervals, or when the control unit switches on or off the switch unit of the converter circuit.

The operating state of the converter circuit may be, e.g., an operating state value such as an inlet current value of the converter and an inlet voltage value of the converter. In this case, the operating state acquisition unit acquires at least one operating state value selected from the group including the inlet current value of the converter and the inlet voltage value of the converter, and the magnetic coupling determination unit may determine whether the converter circuit is a magnetically coupled circuit when the operating state value is equal to or larger than a predetermined value. The predetermined value of the operating state value may be set as appropriate in view of, e.g., the output of the fuel cell etc.

In the case where the converter is connected to the fuel cell and the converter converts the output voltage of the fuel cell, the inlet current value of the converter is uniquely determined by a current-voltage (I-V) curve, current-pressure (I-P) curve, etc. of the fuel cell, and correlates with an output current value of the fuel cell, the operating state value may be the output current value of the fuel cell. Since the output current value of the fuel cell correlates with an output power value of the fuel cell, the operating state value may be the output power value of the fuel cell. Since the output power value of the fuel cell correlates with an input power value of the converter, the operating state value may be the input power value of the converter. Since each of the above operating state values correlates with the required system output, the operating state value may be the required system output. One or more values that correlate with the required system output, such as vehicle speed, acceleration, load weight, and slope of the road on which the vehicle travels, may be acquired as the operating state values. Whether the converter circuit is a magnetically coupled circuit may be determined by using at least one of these values as the operating state value.

Each of the above values may be an actually measured value directly detected by a sensor, a value calculated using a detected value, or a command value from the control unit. The timing at which the operating state acquisition unit acquires the operating state value is not particularly limited as long as it is during operation of the converter. The operating state acquisition unit may acquire the operating state value constantly or at predetermined time intervals.

Figure 8:
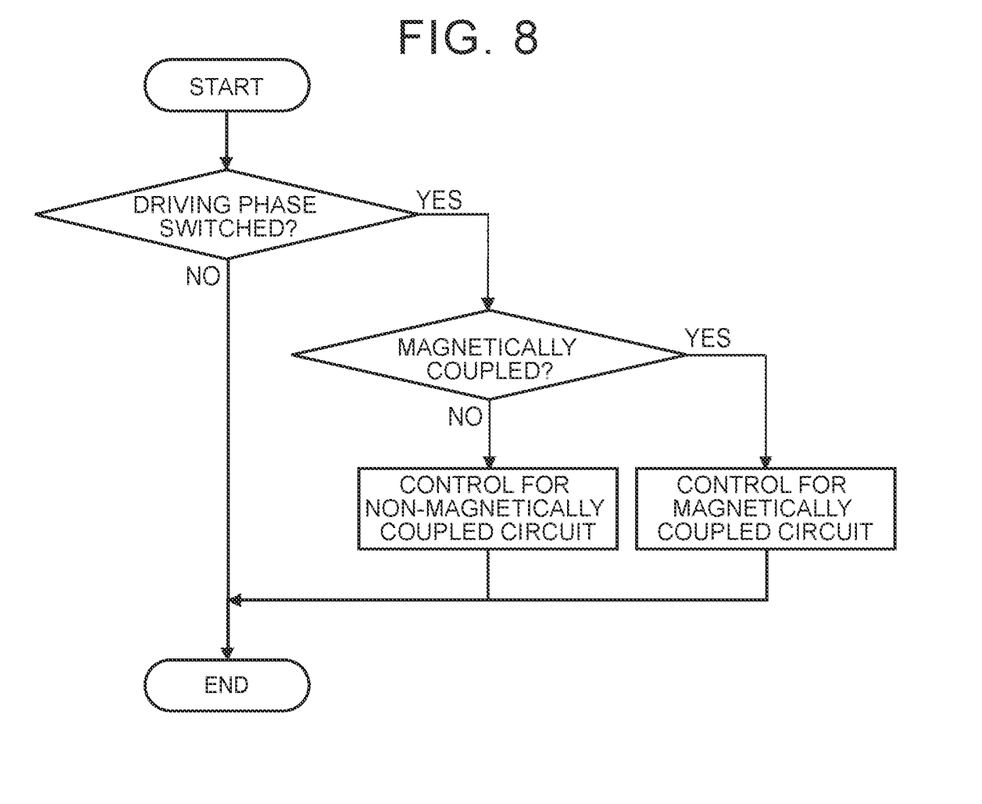
FIG. 8 is a flowchart of another example of the control that is performed by the control device of the present disclosure.

FIG. 8 is a flowchart of another example of control that is performed by the control device of the present disclosure. As shown in FIG. 8, the magnetic coupling determination unit may determine whether the converter circuit is a magnetically coupled circuit when the control unit switches on or off the switch unit of the converter circuit and the number of driving phases changes, and the control unit may change its control method to the control for the non-magnetically coupled circuit or the control for the magnetically coupled circuit according to the determination result. Since the control unit determines whether the converter circuit is a magnetically coupled circuit when the driving phase of the converter circuit is switched, the converter circuit is operated as a non-magnetically coupled circuit during low load and is otherwise operated as a magnetically coupled circuit. This reduces oscillation of the current flowing through the reactor and reduces the possibility that an overcurrent may occur in the reactor, and thus allows operation with high power conversion efficiency.

What is claimed is:

1. A control device for a converter including a one-phase or multiple-phase converter circuit, comprising:
a magnetic coupling determination unit configured to determine whether the converter circuit is a magnetically coupled circuit in which a reactor of the converter circuit is in a magnetically coupled state; and
a control unit configured to change a control method for the converter according to a determination result of the magnetic coupling determination unit.

2. The control device according to claim 1, wherein the control unit is configured to change at least one control method for the converter according to the determination result of the magnetic coupling determination unit, the control method being selected from a group including feedforward control, feedback control, and shutdown control.

3. The control device according to claim 2, wherein the control unit is configured to, when the magnetic coupling determination unit determines that the converter circuit is the magnetically coupled circuit, perform the feedback control in which the control unit changes a feedback gain such that the feedback gain becomes $(L2-M)/L1$ times as large as the feedback gain when the magnetic coupling determination unit determines that the converter circuit is a non-magnetically coupled circuit in which the reactor of the converter circuit is in a non-magnetically coupled state, where $L1$ represents self-inductance of a non-magnetically coupled reactor, $L2$ represents self-inductance of a magnetically coupled reactor, and $M$ represents mutual inductance of the magnetically coupled reactor.

4. The control device according to claim 2, further comprising a failure determination unit configured to determine whether each of multiple phases of the converter circuit has failed, wherein the control unit is configured to, when the magnetic coupling determination unit determines that the converter circuit is the magnetically coupled circuit and the failure determination unit determines that one or more phases included in the multiple phases of the converter circuit have failed, perform the shutdown control in which the control unit stops operation of the failed one or more phases of the converter circuit and stops operation of one or more phases that are included in the remainder of the multiple phases of the converter circuit and that are magnetically coupled to the failed one or more phases of the converter circuit.

5. The control device according to claim 1, wherein
each of multiple phases of the converter circuit is provided with a switch unit, and
the magnetic coupling determination unit is configured to determine that each of the multiple phases of the converter circuit is the magnetically coupled circuit when a slope of a waveform of a current flowing through one of the multiple phases of the converter circuit with respect to time changes at a timing of operation of switching on or off the switch unit of another phase included in the remainder of the multiple phases of the converter circuit, while the control unit switches on or off the switch units of the multiple phases of the converter circuit at different timings.

6. The control device according to claim 1, wherein
each of multiple phases of the converter circuit is provided with a switch unit, and
the magnetic coupling determination unit is configured to determine that each of the multiple phases of the converter circuit is the magnetically coupled circuit when a slope of a waveform of a current flowing through one of the multiple phases of the converter circuit with respect to time changes at a timing that is other than a timing when the switch unit of the one of the multiple phases of the converter circuit is switched on or off and a timing when a value of the current becomes zero, while the control unit switches on or off the switch units of the multiple phases of the converter circuit at different timings.

7. The control device according to claim 1, wherein the magnetic coupling determination unit is configured to determine that the converter circuit is the magnetically coupled circuit when a change in an inlet current of the converter that occurs at a timing when the control unit changes a duty cycle of the converter circuit from 0.25 to 0.50 while an outlet voltage of the converter is twice or more an inlet voltage of the converter is 3 A or less.

8. The control device according to claim 1, further comprising an operating state acquisition unit configured to acquire an operating state of the converter circuit during operation of the converter, wherein the magnetic coupling determination unit is configured to determine whether the converter circuit is the magnetically coupled circuit according to the operating state acquired by the operating state acquisition unit.

9. The control device according to claim 8, wherein:
the operating state acquisition unit is configured to acquire the number of driving phases of the converter circuit; and
the magnetic coupling determination unit is configured to determine whether the converter circuit is the magnetically coupled circuit when the number of the driving phases of the converter circuit changes.

10. The control device according to claim 8, wherein:
the operating state acquisition unit is configured to acquire at least one operating state value selected from a group including an inlet current value of the converter and an inlet voltage value of the converter; and the magnetic coupling determination unit is configured to determine whether the converter circuit is the magnetically coupled circuit when the operating state value is equal to or larger than a predetermined value.

11. A control method for a converter including a one-phase or multiple-phase converter circuit, the control method comprising:
determining by a magnetic coupling determination unit of a control device whether the converter circuit is a magnetically coupled circuit in which a reactor of the converter circuit is in a magnetically coupled state; and
changing by a control unit of the control device a control method for the converter according to a determination result of the magnetic coupling determination unit.

12. The control method according to claim 11, wherein at least one control method for the converter, the control method being selected from a group including feedforward control, feedback control, and shutdown control, is changed by the control unit according to the determination result of the magnetic coupling determination unit.

13. The control method according to claim 12, wherein when the magnetic coupling determination unit determines that the converter circuit is the magnetically coupled circuit, the feedback control is performed in which the control unit changes a feedback gain such that the feedback gain becomes $(L2-M)/L1$ times as large as the feedback gain when the magnetic coupling determination unit determines that the converter circuit is a non-magnetically coupled circuit in which the reactor of the converter circuit is in a non-magnetically coupled state, where L1 represents self-inductance of a non-magnetically coupled reactor, L2 represents self-inductance of a magnetically coupled reactor, and M represents mutual inductance of the magnetically coupled reactor.

14. The control method according to claim 12, further comprising determining by a failure determination unit of the control device whether each of multiple phases of the converter circuit has failed, wherein when the magnetic coupling determination unit determines that the converter circuit is the magnetically coupled circuit and the failure determination unit determines that one or more phases included in the multiple phases of the converter circuit have failed, the shutdown control is performed in which the control unit stops operation of the failed one or more phases of the converter circuit and stops operation of one or more phases that are included in the remainder of the multiple phases of the converter circuit and that are magnetically coupled to the failed one or more phases of the converter circuit.

15. The control method according to claim 11, wherein
each of multiple phases of the converter circuit is provided with a switch unit, and
the magnetic coupling determination unit determines that each of the multiple phases of the converter circuit is the magnetically coupled circuit when a slope of a waveform of a current flowing through one of the multiple phases of the converter circuit with respect to time changes at a timing of operation of switching on or off the switch unit of another phase included in the remainder of the multiple phases of the converter circuit, while the control unit switches on or off the switch units of the multiple phases of the converter circuit at different timings.

16. The control method according to claim 11, wherein
each of multiple phases of the converter circuit is provided with a switch unit, and the magnetic coupling determination unit determines that each of the multiple phases of the converter circuit is the magnetically coupled circuit when a slope of a waveform of a current flowing through one of the multiple phases of the converter circuit with respect to time changes at a timing that is other than a timing when the switch unit of the one of the multiple phases of the converter circuit is switched on or off and a timing when a value of the current becomes zero, while the control unit switches on or off the switch units of the multiple phases of the converter circuit at different timings.

17. The control method according to claim 11, wherein the magnetic coupling determination unit determines that the converter circuit is the magnetically coupled circuit when a change in an inlet current of the converter that occurs at a timing when the control unit changes a duty cycle of the converter circuit from 0.25 to 0.50 while an outlet voltage of the converter is twice or more an inlet voltage of the converter is 3 A or less.

18. The control method according to claim 11, further comprising acquiring by an operating state acquisition unit of the control device an operating state of the converter circuit during operation of the converter, wherein the magnetic coupling determination unit determines whether the converter circuit is the magnetically coupled circuit according to the acquired operating state.

19. The control method according to claim 18, wherein:
the number of driving phases of the converter circuit is acquired by the operating state acquisition unit; and
the magnetic coupling determination unit determines whether the converter circuit is the magnetically coupled circuit when the number of the driving phases of the converter circuit changes.

20. The control method according to claim 18, wherein:
at least one operating state value selected from a group including an inlet current value of the converter and an inlet voltage value of the converter is acquired by the operating state acquisition unit; and
the magnetic coupling determination unit determines whether the converter circuit is the magnetically coupled circuit when the operating state value is equal to or larger than a predetermined value.

* * * * *